United States Patent [19]

Johnson et al.

[11] 4,340,377
[45] Jul. 20, 1982

[54] SPEED CHANGE DEVICE

[75] Inventors: Ted W. Johnson, 214 N. Fifth St., Griffin, Ga. 30223; William R. Hamilton, Cleveland; Archie I. Hamilton, Atlanta, both of Ga.

[73] Assignees: Hamilton Bros. Mfg. Co., Atlanta; Ted W. Johnson, Griffin, both of Ga.; a part interest

[21] Appl. No.: 161,888

[22] Filed: Jun. 23, 1980

[51] Int. Cl.³ .......................... F16H 9/06; F16H 7/12
[52] U.S. Cl. ........................................................ 474/81
[58] Field of Search ...................... 474/81, 80, 78, 128, 474/129, 79

[56] References Cited

U.S. PATENT DOCUMENTS

| | | | |
|---|---|---|---|
| 1,374,109 | 4/1921 | Pierle | 474/81 |
| 1,469,856 | 10/1923 | Traufler | 474/81 |
| 1,620,214 | 3/1927 | Klausmeyer | 474/81 |
| 2,263,438 | 11/1941 | Garvin | 474/81 |
| 2,504,529 | 4/1950 | Isom | 474/81 |
| 2,783,655 | 3/1957 | Meckoski | 474/77 |
| 3,062,065 | 11/1962 | Shaw | 474/75 |
| 3,216,266 | 11/1965 | Sunnen | 474/75 |
| 3,762,229 | 10/1973 | Johnson | 474/77 |
| 3,848,448 | 11/1974 | Allen | 474/81 |
| 3,979,964 | 9/1976 | McCordall | 474/69 |

Primary Examiner—C. J. Husar
Assistant Examiner—Conrad L. Berman
Attorney, Agent, or Firm—Newton, Hopkins & Ormsby

[57] ABSTRACT

Complementary relatively stationary pulleys having axially oppositely stepped diameter portions form a variable speed drive between a motor coupled with one stepped pulley and a driven device coupled with the oppositely stepped pulley such as the spindle of a drill press on which the device is mounted. A transmission belt for the stepped pulleys is bodily shifted with an associated belt tensioning idler pulley, a belt shaper guide, and a compression belt former selectively to position the belt in alignment with chosen diameter portions of the two stepped pulleys to effect a desired speed change while the belt is in a deformed state out of contact with the stepped pulleys, following which the belt is retensioned to engage it with the chosen stepped portions of the complementary stepped pulleys.

10 Claims, 8 Drawing Figures

SPEED CHANGE DEVICE

BACKGROUND OF THE INVENTION

Numerous speed change mechanisms including those which employ oppositely stepped pulleys and coacting transmission belts are known in the prior art. The general objective of this invention is to improve on the prior art particularly in terms of a belt shifting arrangement to effect a desired speed change with convenience, reliability and safety.

Another important object of the invention is to provide a speed change mechanism for belt and pulley variable speed transmissions which is highly simplified, durable and inexpensive to manufacture.

Another object is to provide a speed change mechanism having automatic safety locking means to prevent shifting of the transmission belt while it is actively engaged with chosen complementary stepped portions of the multiple diameter transmission pulleys.

An object of the invention is to provide a speed change mechanism of the mentioned type ideally suited for driving the spindle of a drill press but also capable of transmitting variable speed rotation to a wide variety of driven devices.

Still another object is to provide a speed change mechanism which is highly compact.

Other features and advantages of the invention will become apparent during the course of the following description.

DETAILED DESCRIPTION

Figure 4:
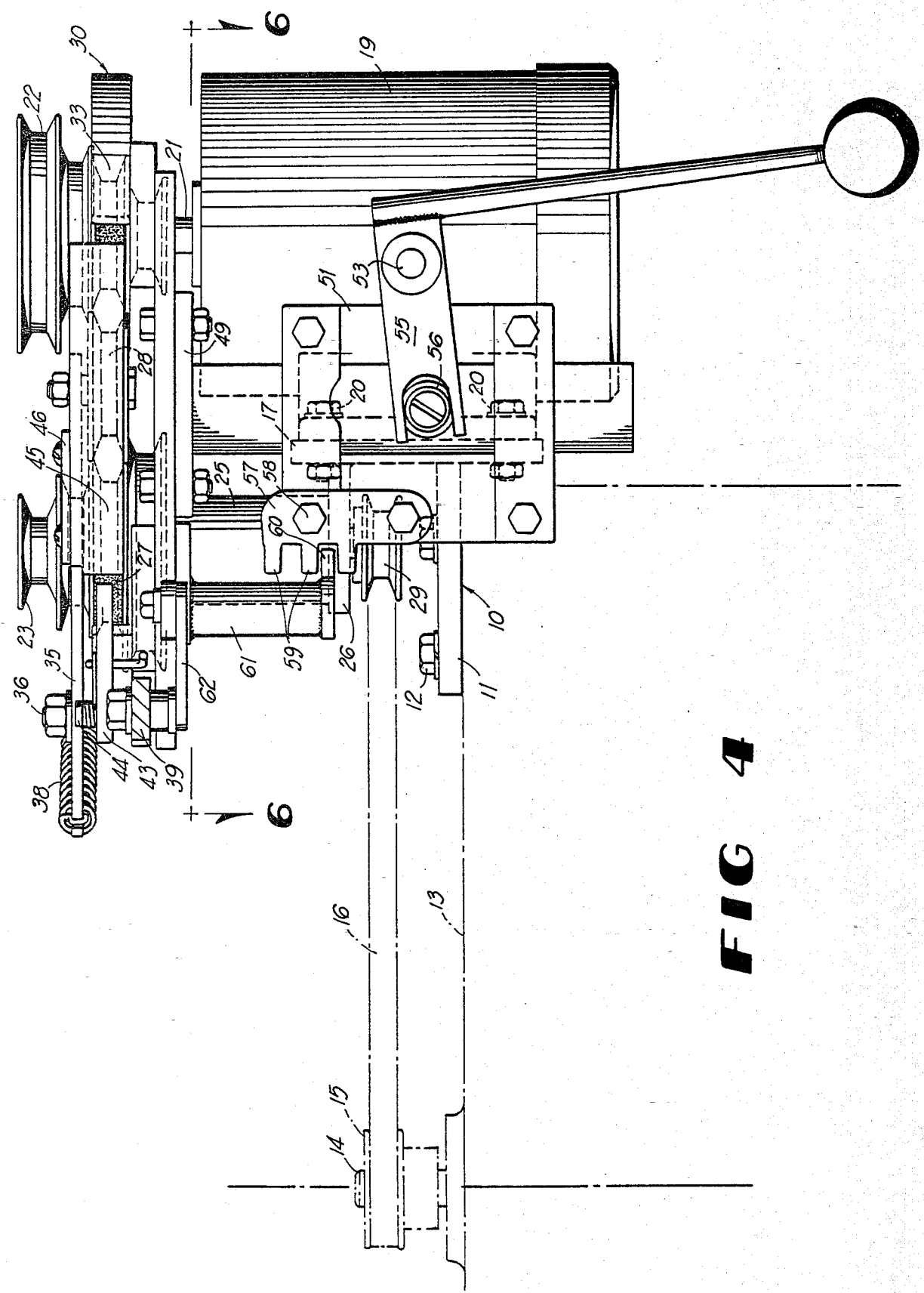
FIG. 4 is a side elevation of the speed change device.

Referring to the drawings in detail wherein like numerals designate like parts, the numeral 10 designates a rigid mounting frame for the device including a base plate 11 attachable by fastener means 12 to a drill press 13, FIG. 4, having a spindle 14 requiring rotational driving at variable speeds through a pulley 15 and belt 16. While the speed change device is shown in association with a drill press spindle, it should be understood that the invention is not limited to this usage and may be employed in connection with any rotational machine element requiring precision driving at a number of different speeds.

The mounting frame 10 also includes a vertical plate 17 to which the support plate 18 or base of an electrical drive motor 19 is fixedly attached by fastener means 20.

The armature shaft 21 of motor 19 is coupled with and drives a first multiple diameter stepped pulley 22 preferably including three stepped diameter portions which diminish in size in one axial direction, as shown. A complementary multiple diameter stepped pulley 23 having the same number of stepped portions as the pulley 22 is arranged so that the diameters of the pulley steps diminish in the opposite axial direction to the parallel axis pulley 22. The stepped pulley 23 is secured to a shaft 24 spaced from and parallel to the motor shaft 21 and supported on a post structure 25 rising from a plate extension 26 of mounting frame 10. Thus, the motor 19 and the two complementary pulleys 22 and 23 form a fixed assembly with the supporting frame 10, which assembly is unitized for attachment to a drill press or other machine.

Figure 3:
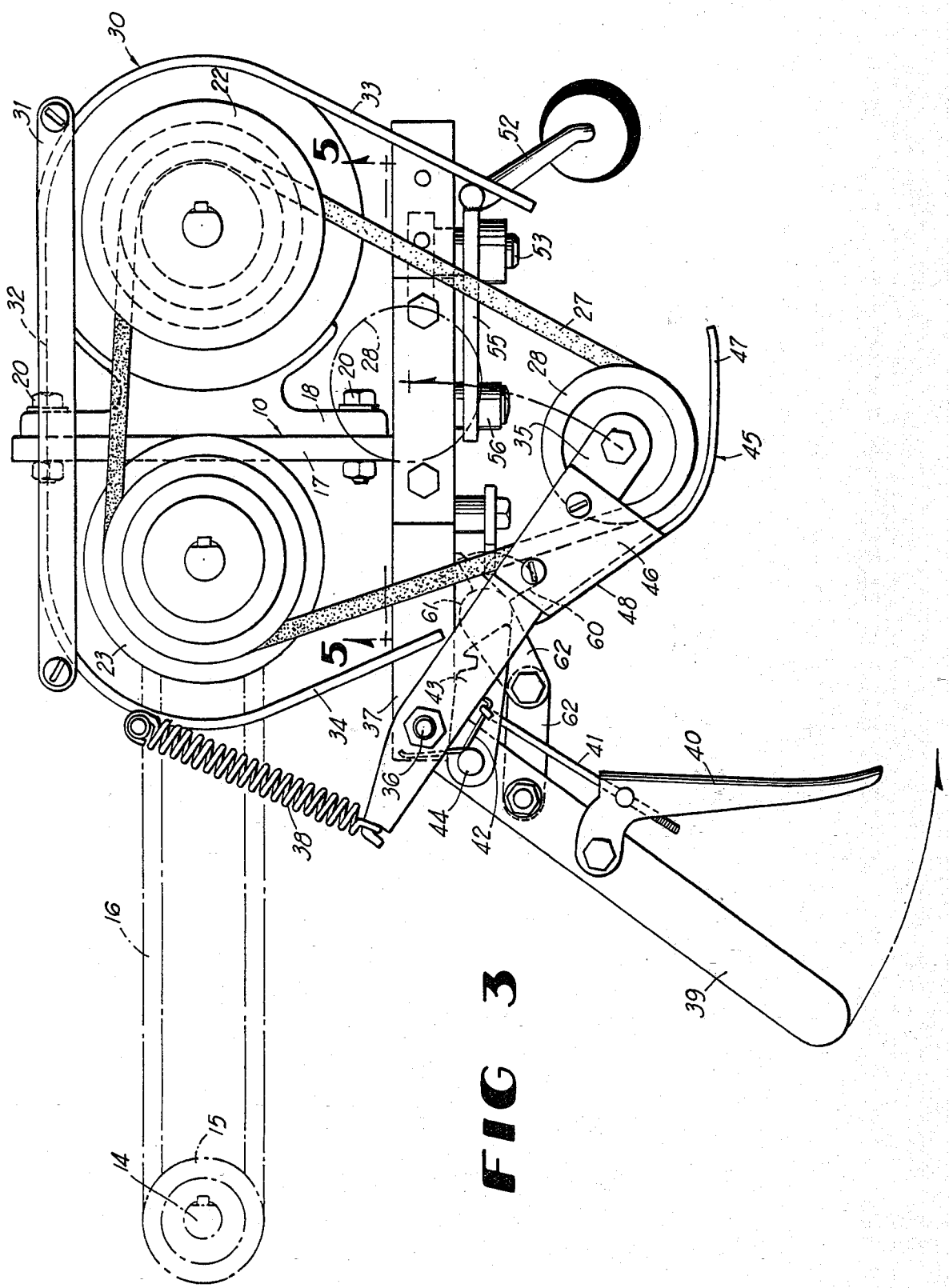
FIG. 3 is a similar view showing the belt tensioned and drivingly engaging the pulleys.
Figure 5:
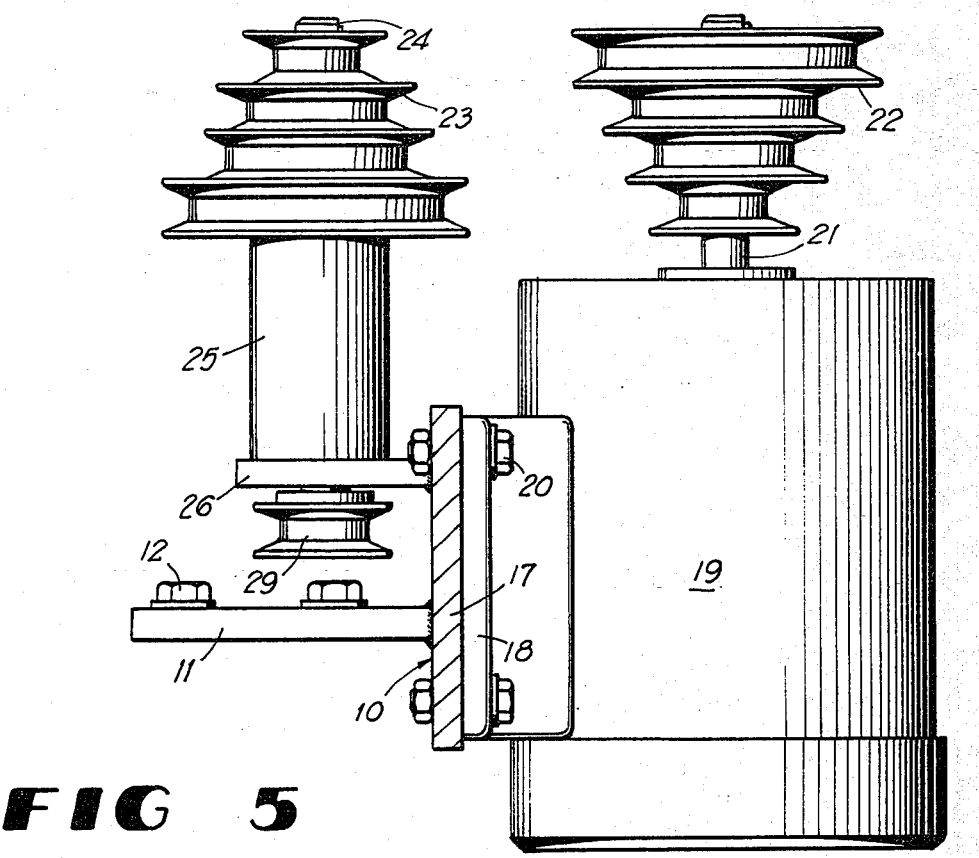
FIG. 5 is a fragmentary vertical section taken on line 5—5 of FIG. 3.
Figure 6:
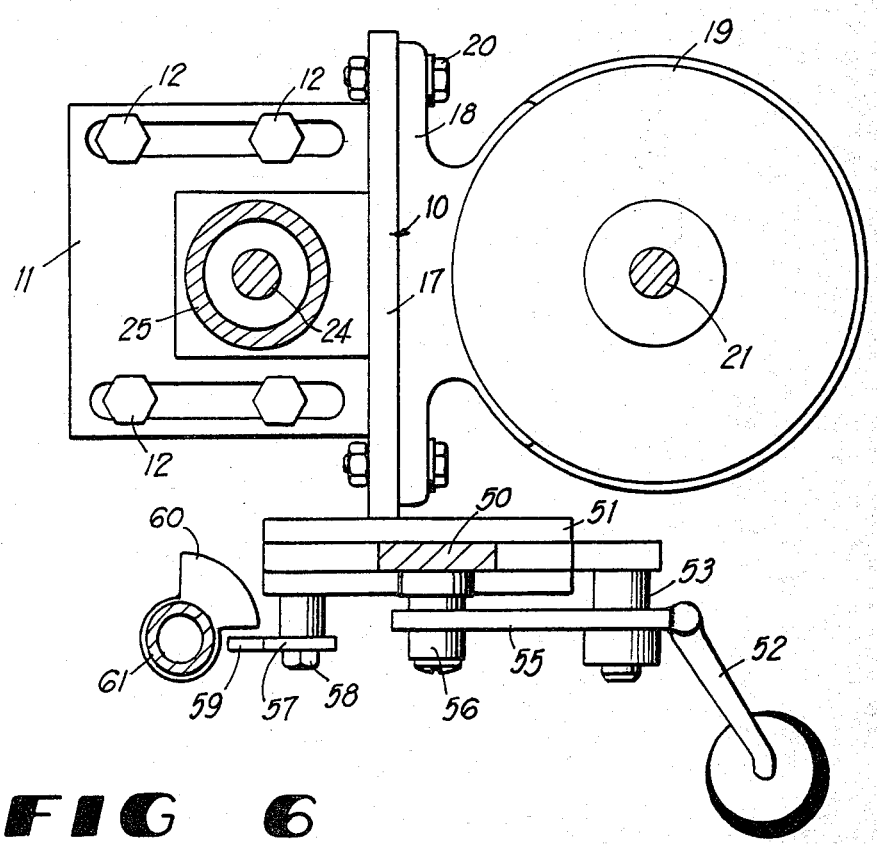
FIG. 6 is a horizontal section taken on line 6—6 of FIG. 4.

In the speed change device, the two pulleys 22 and 23 in a power transmitting mode, FIG. 3, have selected stepped diameter portions coupled through a transmission belt 27 which is in a taut state under control of an idling belt tensioning pulley 28, to be further discussed. In such driving mode, the belt 27 transmits power from the pulley 22 to the pulley 23 at a selected rotational speed dependent on which steps of the two pulleys the belt is engaging. The essence of this invention, about to the described, comprises a simple, convenient and very reliable means for shifting the belt with the idler pulley 28 and associated parts axially of the pulleys 22 and 23 to different aligned steps or diameter portions of the two pulleys to effect required variations in speed. As shown in FIGS. 4 and 5, a take-off pulley 29 on the lower end of shaft 24 transmits power at a chosen rotational speed through the belt 16 to the drill press spindle 14 or other driven component.

Figure 1:
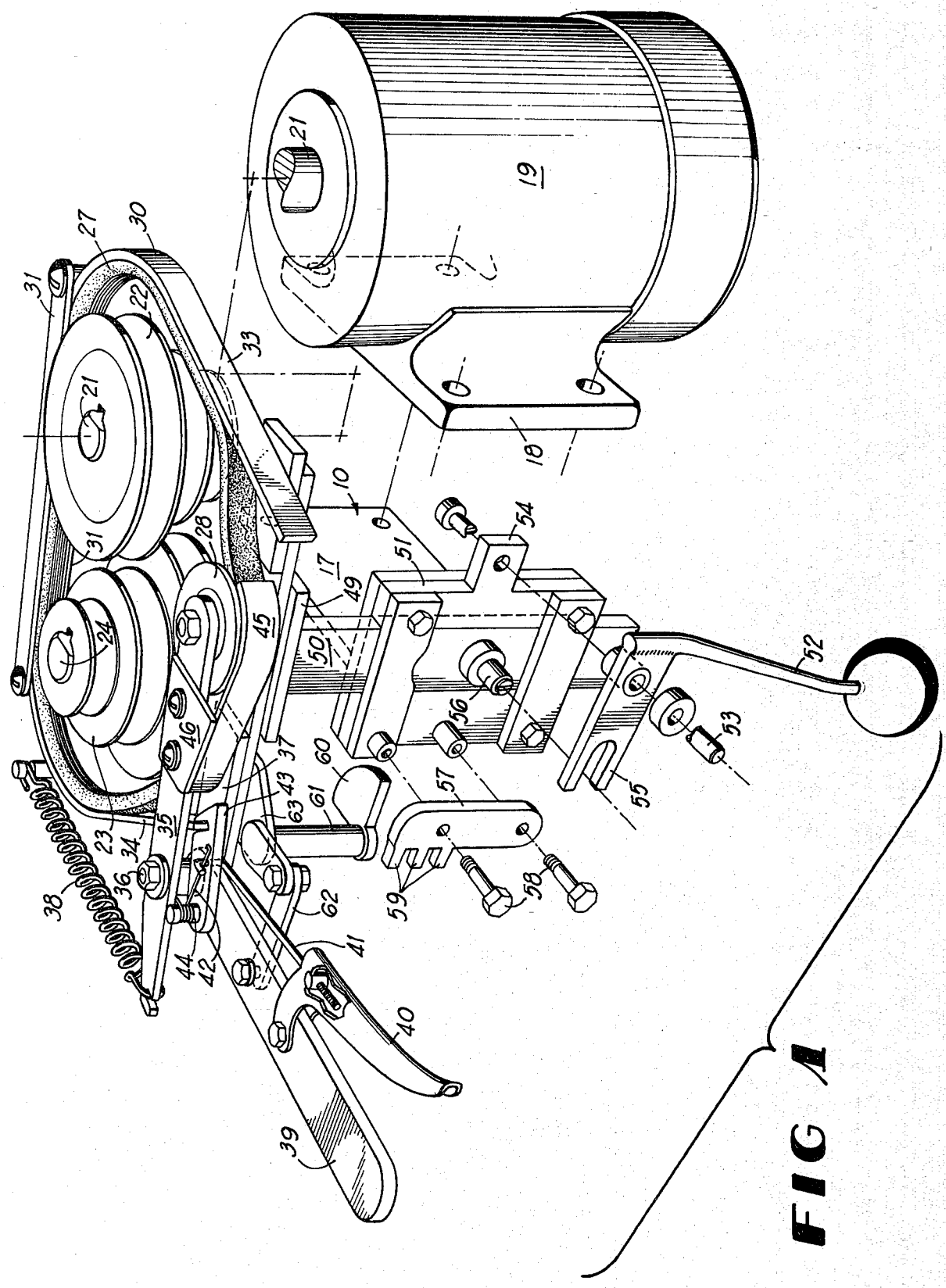
FIG. 1 is a partly exploded perspective view of a speed change device embodying the invention.
Figure 2:
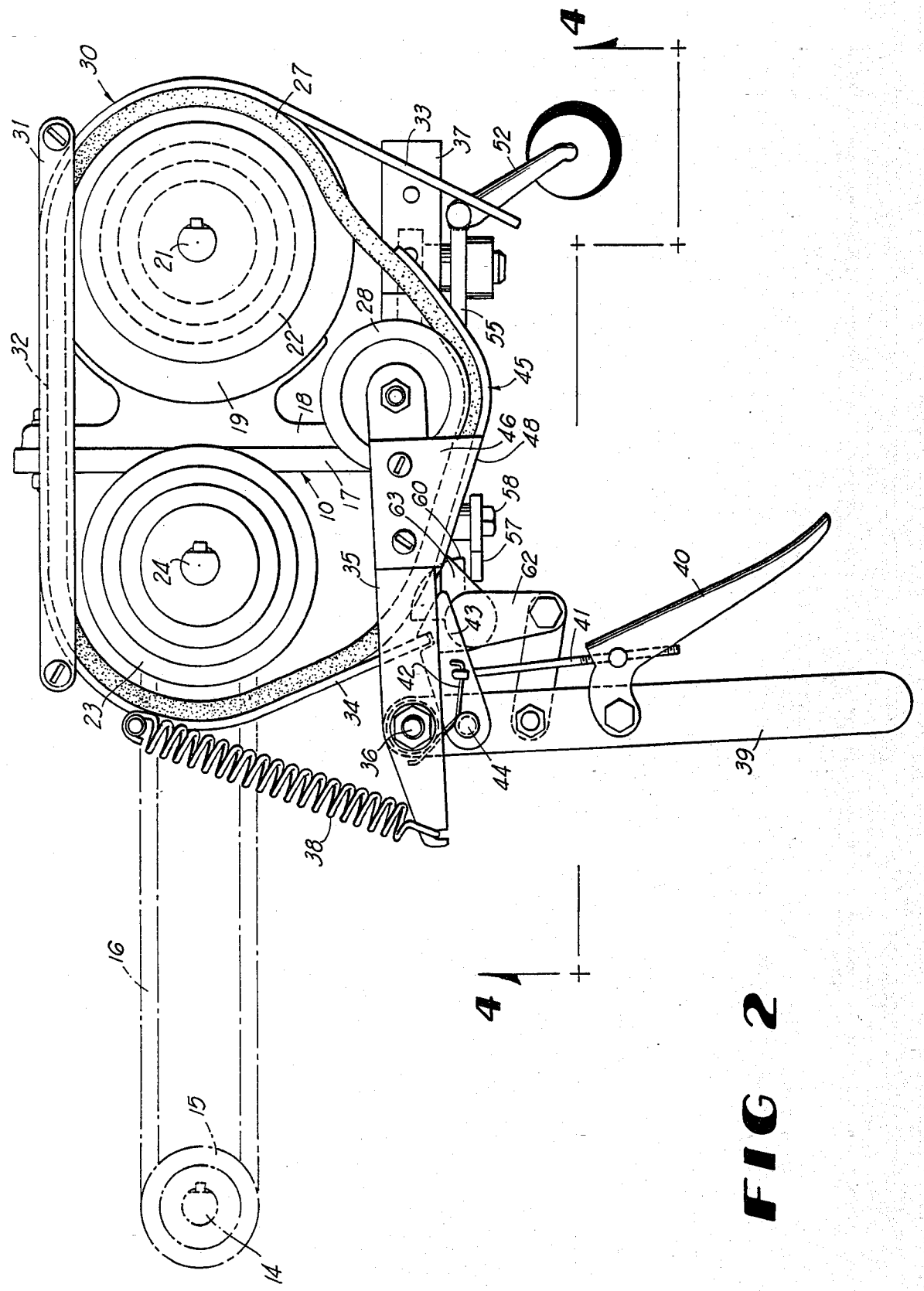
FIG. 2 is a plan view of the device showing the transmission belt in a deformed state out of driving engagement with the stepped pulleys.

The belt shifting means forming the essence of the invention comprises a substantially rigid belt shaper guide 30 having spaced parallel belt support plates 31 along its rear side between which a straight stretch of the belt may enter for support when the belt is relaxed and compressively deformed, as shown in FIGS. 1 and 2. The belt shaper guide 30 is spaced from the two pulleys 22 and 23 and extends around their outer sides on arcs which are concentric with the pulleys and across their two sides which are remote from the idler pulley 28 in a straight stretch 32. The opposite or forward dies of the two pulleys 22 and 23 nearest the idler 28 are not encompassed by the belt shaper guide 30 which terminates in two straight convergent portions 33 and 34 projecting toward the idler 28. Thus, the belt shaper guide 30 encompasses approximately a 120 degree arc around each pulley 22 and 23 and extends across their rearward sides but does not encompass their forward sides. The belt shaper guide 30 is in fixed spaced relationship to the peripheries of the two pulleys, as shown.

The belt tensioning idler pulley 28 is mounted on a swingable arm 35 in a plane perpendicular to the axes of pulleys 22 and 23. The arm 35 is pivoted at 36 to an underlying bar 37 which extends across the open side of the belt shaper guide 30 and supports the converging portions 33 and 34 of the belt shaper guide which are suitably fixed to the bar 37. The end of swingable arm 35 remote from pulley 28 is attached to a spring 38 and biased thereby at all times toward the belt tensioning or active position of the device shown in FIG. 3 where the belt 27 is engaged with selected steps of the two pulleys 22 and 23.

The swingable arm 35 is operated on its pivot 36 against the force of spring 38 by a hand lever extension 39 extending at right angles to the arm 35 and fixed thereto. A squeeze lever 40 on the hand lever 39 is connected through a rod 41 with a biasing spring 42 of a pawl 43 pivoted to the lever 39 at 44. As shown in FIGS. 1 and 2, when the squeeze lever 40 is released, the pawl 43 may engage the end of extension 34 to releasably lock swingable arm 35 and associated parts in a rotated position where the spring 38 is stretched and tensioning pulley 28 is swung inwardly counterclockwise around the pivot 36 to remove tension from the belt 27 and disengage the belt from the two pulleys 22 and 23. When it is desired to return the arm 35 and pulley 28 to the active power transmitting position of FIG. 3, after a speed change has been made, the lever 40 is squeezed to release the pawl 43 from extension 34, and the spring 38 automatically returns the arm 35 to the position of FIG. 3 to tension the belt 27.

Acting in concert with the belt shaper guide 30 and forming a key element of the invention is a compression belt former 45 fixed to the arm 35 through a bracket 46. The compression belt former is substantially rigid and is spaced outwardly of the periphery of pulley 28 and follows the arcuate periphery thereof for about 60 degrees terminating in a substantially straight extension 47 which is divergent in relation to another straight section 48 of the compression belt former 45 proximal to the hand lever 39. The compression belt former 45 is at the same elevation as the fixed belt shaper guide 30 and swings with the arm 35 relative to the back side 32 of the belt shaper guide 30.

As clearly shown in FIGS. 1 and 2, when the hand lever 39 and arm 35 with pulley 28 are swung counterclockwise, the belt 27 is relaxed and is deformed by the opposing action of the belt shaper guide 30 and compression belt former 45 acting on opposite portions of the belt. In effect, the belt is compressed in a single plane and the resistance of the belt to this compression or foreshortening causes it to assume the deformed shape best shown in FIG. 2 against the elements 30 and 45 and to move entirely out of engagement with the pulleys 22 and 23 while remaining engaged with the smaller pulley 28. While so held and positioned, the belt 27 is free to be shifted axially of the pulleys 22 and 23 to new stepped portions of the pulleys to effect a desired speed change.

The shifting of the belt 27 axially of the pulleys 22 and 23 to produce a speed change is accomplished as follows. The bar 37 which supports the elements 30, 35, 39, 38 and 28 is attached to the top crosshead 49 of a mast or slide 50 extending at right angles to the bar 37 and below it. The slide 50 reciprocates in a fixed guide housing 51 attached rigidly to mounting frame 10. A control lever 52 pivoted at 53 to an extension 54 of guide housing 51 includes a bifurcated crank arm 55 cammingly engaging a roller 56 on the slide 50 whereby swinging of the control lever 52 on its pivot will raise and lower the slide 50 and all components thereon including the transmission belt 27 relative to the stepped pulleys 22 and 23. When the deformed belt 27 is thus positioned adjacent to the grooves of stepped pulleys 22 and 23 to produce the desired speed for spindle 14, the squeeze lever 40 is used to release the pawl 43 and spring 38 automatically returns the arm 35, pulley 28 and belt 27 to the power transmitting position of FIG. 3. In such position, the belt 27 is no longer engaged with elements 30 and 45 as shown in FIG. 3.

A safety feature on the speed change device comprises a positioning plate 57 attached at 58 to fixed guide 51 and having projecting teeth 59 on one side thereof. A cooperating sector plate 60 on a vertical shaft 61 is adapted to be turned by a toggle linkage 62 coupled between hand lever 39 and shaft 61, such shaft being supported on an extension 63 of bar 37. When hand lever 39 and arm 35 swing to the position of FIG. 2 to deform the belt 27 in preparation for shifting the belt, the sector plate 60 is swung out of engagement with the teeth 59 by linkage 62 so that the belt and associated parts are free for shifting with the slide 50. However, when hand lever 39 and arm 35 are released to the position of FIG. 3, the linkage 62 rotates sector plate 60 between one pair of teeth 59 or below the lowermost tooth to lock the belt and associated parts against shifting axially of pulleys 22 and 23 when the latter are actively transmitting power at a certain speed. Thus, if someone should put pressure on the lever 52 at the wrong time, the slide 50 will not move due to the locking action of the teeth 59 on sector plate 60.

Figure 7:
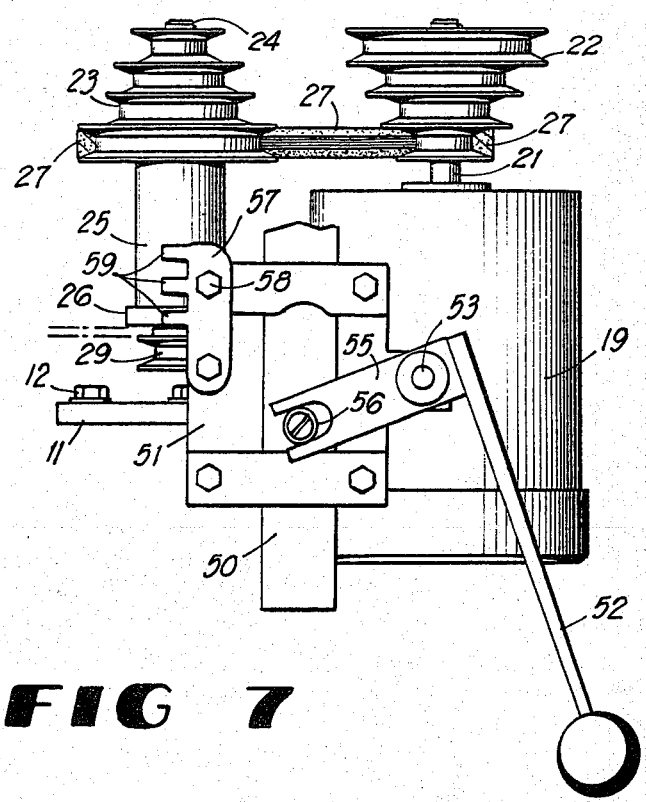
FIG. 7 is a fragmentary side elevation of the device with parts omitted showing a belt shifting mast and associated elements in one extreme position of adjustment.
Figure 8:
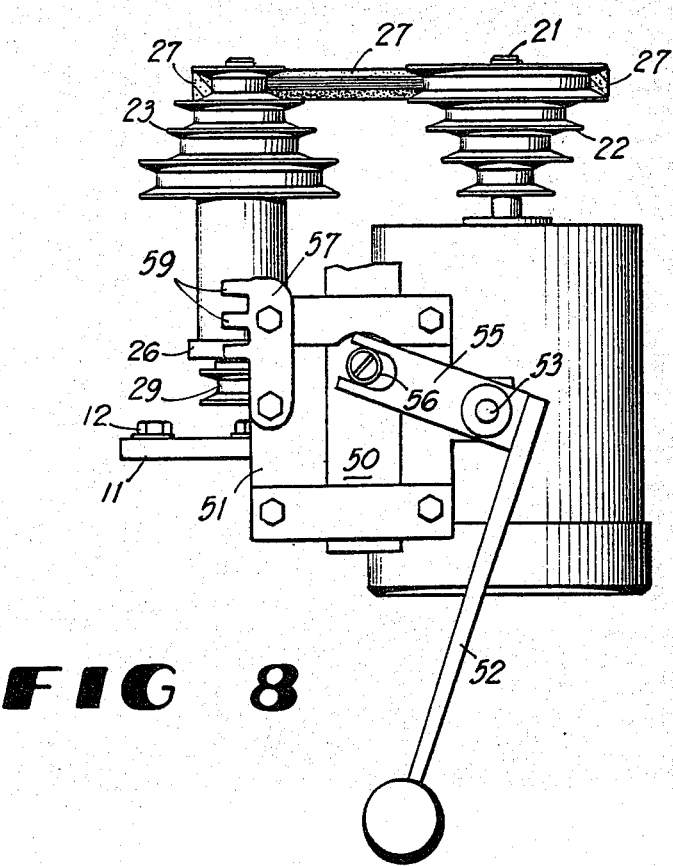
FIG. 8 is a similar view showing the mast in another extreme position of adjustment.

FIG. 4 shows transmission belt 27 engaged with intermediate diameter grooves of pulleys 22 and 23 and sector plate 60 is shown in the intermediate locked position between the two lowermost teeth 59. FIG. 7 shows slide 50 in the lowermost position and belt 27 engaged with the lowermost pulley grooves. FIG. 8 shows the slide 50 fully elevated and the belt engaged with the uppermost pulley grooves or diameters.

In summation, the speed change device embodies two fixed reversely tapering stepped pulleys on spaced parallel axes and means for selectively engaging the transmission belt 27 with the several grooves of the pulleys to enable the required speed change. This is accomplished by operating hand lever 39 and swing arm 35 to relax the belt 27 and deform it by the compressive force of fixed belt shaper guide 30 and movable compression belt former 45. Following such deformation of the belt 27 to separate it from pulleys 22 and 23, the slide 50 is raised or lowered by use of control lever 52 to shift the belt upwardly or downwardly for alignment with the proper pulley grooves to effect the required speed change. During such shifting of the belt, the sector plate 60 is free of locking teeth 59. When the belt shifting is accomplished, the latching pawl 53 is released and hand lever 39, swing arm 35 and tensioning pulley 28 with compression belt former 45 return to the power transmitting position of FIG. 3 automatically under influence of spring 38, where the belt 27 is tight and spaced from elements 30 and 45.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A speed change device comprising a support, spaced parallel axis oppositely tapering stepped pulleys on the support in fixed relationship thereto, rotational power means drivingly coupled with one of said pulleys, a transmission belt engageable with said pulleys to transmit power at selected speeds, a slide on said support and having a movement path parallel to the rotational axes of said pulleys, a belt tensioning and belt shifting pulley continuously engaged with said belt, a swingable support structure for the belt tensioning and belt shifting pulley on said slide, a compression belt former on said swingable support structure adjacent to the belt tensioning and belt shifting pulley, a relatively stationary belt shaper guide partly encompassing said stepped pulleys and being in opposed relationship to said compression belt former, and means to move the slide in opposite directions on said support when said belt is relaxed and compressed and deformed by said belt shaper guide and compression belt former and separated from the stepped pulleys.

2. A speed change device as defined in claim 1, and resilient means connected with said swingable support structure and biasing it in a direction causing said belt tensioning and belt shifting pulley to tension said belt, and releasable latch means connected with said swingable structure to hold it against the action of said resilient means in a position where said belt is relaxed and deformed by the action of said belt shaper guide and compression belt former.

3. A speed change device as defined in claim 1, and said swingable support structure moving in a plane across the axes of said stepped pulleys and comprising a hand lever and a swing arm rigid with the hand lever and projecting beyond one side thereof and carrying said belt tensioning and belt shifting pulley and said compression belt former.

4. A speed change device as defined in claim 1, and said means to move the slide in opposite directions comprising a pivoted control lever on said support, a camming part on said control lever, and a cam follower part on said slide engaged with said camming part, whereby rotation of the control lever imparts linear movement to the slide in a guideway fixed to said support.

5. A speed change device as defined in claim 1, and releasable rotational locking means connected with and operated by movement of said swingable support structure to lock said slide against movement when said swingable structure is in a belt tensioning power transmitting position.

6. A speed change device as defined in claim 1, and said belt shaper guide comprising a substantially rigid strip element fixed on said slide in spaced relation to the stepped pulleys and extending across corresponding sides of the pulleys and at least partially around their outer circumferential side edges, said compression belt former being arcuate at least in part and being spaced from the belt tensioning and belt shifting pulley and extending around a part of the circumference of the latter which is remote from the stepped pulleys.

7. A speed change device comprising a support, a pair of spaced parallel axis oppositely tapering stepped pulleys on the support, rotational driving means for one stepped pulley on the support, a transmission belt engageable with both of said pulleys to transmit power from the driving pulley to the driven pulley at preselected different speeds, a linear slide means on the support movable on a path parallel to the rotational axes of said pulleys, and manually movable means on said slide means operable selectively to tension said belt and hold the belt in power transmitting engagement with said pulleys and to relax the belt and compressively deform it to cause complete separation of the belt from said pulleys whereby the belt is shiftable with the slide means relative to said pulleys into alignment with selected steps of said pulleys.

8. A speed change device as defined in claim 7, and means resiliently biasing said manually movable means in a direction to tension said belt.

9. A speed change device as defined in claim 8, and said manually movable means comprising a swingable bell crank means carrying a belt tensioning and belt shifting pulley on one arm thereof.

10. A speed change device as defined in claim 9, and a compression belt former on said one arm of the bell crank adjacent to the belt tensioning and belt shifting pulley and preventing separation of the belt from such pulley when the belt is relaxed and compressively deformed to separate it from said stepped pulleys, and a fixed belt shaper guide on said slide means in opposing relationship to said compression belt former and spaced sufficiently from the peripheries of said stepped pulleys to allow separation of the belt from the latter while applying deforming compression to the belt.

* * * * *